Patented Sept. 27, 1927.

1,643,675

UNITED STATES PATENT OFFICE.

JOHN ALEXANDER MONTGOMERIE, OF GLASGOW, SCOTLAND.

BITUMINOUS EMULSION.

No Drawing. Application filed June 13, 1924, Serial No. 719,739, and in Great Britain December 8, 1923.

This invention relates to the production of aqueous bituminous emulsions.

It has heretofore been proposed to prepare an aqueous bituminous emulsion by melting bitumen, adding thereto, with agitation, a small proportion of fatty acid and/or resin or resin oil, and then adding, with agitation, a dilute solution of caustic soda or caustic potash or sodium or potassium carbonate at a temperature of about 215° to 225° F.

As the result of experimental research I have ascertained that, in fact, a satisfactory emulsion may be prepared by direct treatment of the bitumen with dilute aqueous alkaline solution, that is without addition of fatty acid or resin or resin oil, if the melted bitumen is poured into the hot solution, with agitation, or if the hot solution is added rapidly to the bitumen, with agitation.

My present invention consists in producing a bituminous emulsion by admixing directly, with agitation, melted bitumen and a dilute aqueous alkaline solution.

As an example in carrying out my present invention there may be used:—

800 parts by weight of Mexican asphalt.
4 parts of caustic potash.
560 parts of water, in which the caustic potash is dissolved.

It is preferable to pour the melted bitumen into the hot alkali solution, but, if desired, the hot alkali solution may be added to the melted bitumen. In either case the addition is made with agitation, e. g., by stirring, and the temperature of the mixture during the addition is maintained at about 100° C.

The above example is given as one which has been found in practice to give an excellent result, but the nature of the alkali as also its ratio and the ratio of water to bitumen may be varied. It is impossible to define precisely the range of variation of these ratios, as this is influenced by the nature of the bitumen, but the quantities given in the example will be found to give good results with many different specimens of bitumen, as will also be the case if instead of 4 parts of caustic potash there be used in the example 6 parts thereof.

For the purpose of increasing the "emulsion effect" and/or its permanency there may be added to the emulsion when prepared a small percentage of soap.

An emulsion produced as above described may be used as a binding medium in road making, or for coating structures etc., in the manufacture of briquettes and for other purposes for which such emulsions are employed.

By the term "bitumen" is meant mineral pitch or asphalt to the exclusion of fluids, such as tars, oil, etc., which it has previously been proposed to mix or saponify with dilute aqueous caustic alkaline solution when heated up to 110° F.

It is believed that the ingredient of Mexican asphalt saponified by the treatment with alkali is one or other of the carboxylic acid derivatives or hydroxy derivatives of the naphthenes or a mixture of these. The properties of these substances have not yet been fully investigated by chemists.

What I claim is:—

1. The process of producing a stable liquid emulsion consisting in mixing directly, while stirring, melted asphalt containing in its natural state a saponifiable material solid at normal temperature and dilute aqueous caustic alkaline solution at a temperature of about 215° F., to effect a reaction between the alkali and the saponifiable ingredient of said asphalt.

2. The process of producing a stable liquid emulsion consisting in melting Mexican asphalt which is solid at normal temperature then pouring it into a dilute aqueous caustic alkaline solution at a temperature of about 215° F. and stirring the mixture to effect a reaction between the alkali and one of the ingredients of said asphalt.

In testimony whereof I have signed my name to this specification.

JOHN A. MONTGOMERIE.